United States Patent
Davis et al.

(10) Patent No.: US 9,898,725 B2
(45) Date of Patent: Feb. 20, 2018

(54) PASSENGER INFORMATION MODULE

(71) Applicant: Creative Mobile Technologies, LLC, Long Island, NY (US)

(72) Inventors: Jesse H. Davis, Demarest, NJ (US); John J. Backof, II, Westchester, PA (US); Mitchell Dinowitz, Dix Hills, NY (US)

(73) Assignee: CREATIVE MOBILE TECHNOLOGIES, LLC, Long Island City, NY (US)

( * ) Notice: Subject to any disclaimer, the term of this patent is extended or adjusted under 35 U.S.C. 154(b) by 0 days.

(21) Appl. No.: 14/185,503

(22) Filed: Feb. 20, 2014

(65) Prior Publication Data

US 2014/0244412 A1 Aug. 28, 2014

Related U.S. Application Data

(60) Provisional application No. 61/768,384, filed on Feb. 22, 2013, provisional application No. 61/850,753, filed on Feb. 22, 2013.

(51) Int. Cl.
*G06Q 20/20* (2012.01)
*G09B 21/00* (2006.01)

(52) U.S. Cl.
CPC ......... *G06Q 20/204* (2013.01); *G09B 21/006* (2013.01); *G09B 21/008* (2013.01)

(58) Field of Classification Search
CPC .... G06Q 20/204; G06Q 10/08; G09B 21/008; G09B 21/006

USPC .......... 705/17, 34, 28, 26.3, 335, 26.8, 417; 701/213, 469; 340/995.24, 995.12
See application file for complete search history.

(56) References Cited

U.S. PATENT DOCUMENTS

| | | | | |
|---|---|---|---|---|
| 6,088,648 | A * | 7/2000 | Shah | G01C 21/3446 340/995.18 |
| 6,850,153 | B1 * | 2/2005 | Murakami | B60L 11/1816 235/384 |
| 7,227,475 | B1 * | 6/2007 | Provenzano | G08G 1/20 340/995.12 |
| 7,644,039 | B1 * | 1/2010 | Magee | G06Q 20/1085 221/9 |
| 2002/0057212 | A1 * | 5/2002 | Hamilton et al. | 340/988 |
| 2003/0227375 | A1 * | 12/2003 | Yong | 340/425.5 |
| 2009/0192851 | A1 * | 7/2009 | Bishop | G06Q 10/08 705/26.3 |
| 2013/0297463 | A1 * | 11/2013 | Garber | 705/28 |
| 2014/0157636 | A1 * | 6/2014 | Safavi | 40/448 |
| 2014/0303807 | A1 * | 10/2014 | Addepalli | H04W 4/046 701/1 |

* cited by examiner

*Primary Examiner* — Vanel Frenel
(74) *Attorney, Agent, or Firm* — Klintworth & Rozenblat IP LLP

(57) ABSTRACT

A method and system utilizes an interface for the blind and low vision passengers in a touch screen passenger information module (PIM). The PIM is enabled to operate in at least two modes. A low vision mode provides different user input framework on the touch screen as well as appropriate audio prompting. The interface enables a blind or low vision person to interact with the PIM easily, including using the PIM to pay for the fare. The low vision mode can be initiated by the passenger.

19 Claims, 16 Drawing Sheets

Cash Payment

1. Charge

2. Enter Tip

3. Tip Amount

4. Payment Swipe

PASSENGER INFORMATION MODULE

CROSS-REFERENCE TO RELATED APPLICATIONS

This application is a continuation of U.S. Provisional Application Ser. No. 61/768,384, filed Feb. 22, 2013 and U.S. Provisional Application Ser. No. 61/850,753, filed Feb. 22, 2013, the entire contents of which are incorporated by reference herein.

BACKGROUND

Touch screen devices have become useful items in, for example, taxicabs where the devices are programmed to operate as part of a passenger information module (PIM). A PIM includes a touch screen device installed in the taxicab that displays various information to a passenger, such as a map of the taxi's location, advertising or other video, and fare information. Taxicab PIM's can work with a credit card payment device to enable the passenger to pay for their fare without handing their credit card or other payment device to the driver. These PIMs have become popular in a relatively short period of time due to the flexibility of their touch screens to provide a variety of different functions.

BRIEF DESCRIPTION OF THE DRAWINGS

In association with the following detailed description, reference is made to the accompanying drawings, where like numerals in different figures can refer to the same element.

DETAILED DESCRIPTION

Systems, methods and computer implemented logic utilize an interface for the blind and low vision, e.g., visually impaired, passengers in touch screen passenger interfaces (PIMs). The PIMs include a multi-mode PIM enabled to operate in at least two modes. A low vision mode provides different visual input framework on the touch screen as well as appropriate audio prompting. The interface enables a blind or low vision person to interact with the PIM, including using the PIM to pay for the fare, and determine a tip, when it is located in a vehicle for hire, e.g., taxicab. The low vision mode can be initiated by the passenger, initiated by the driver of the vehicle, or both.

Figure 1:
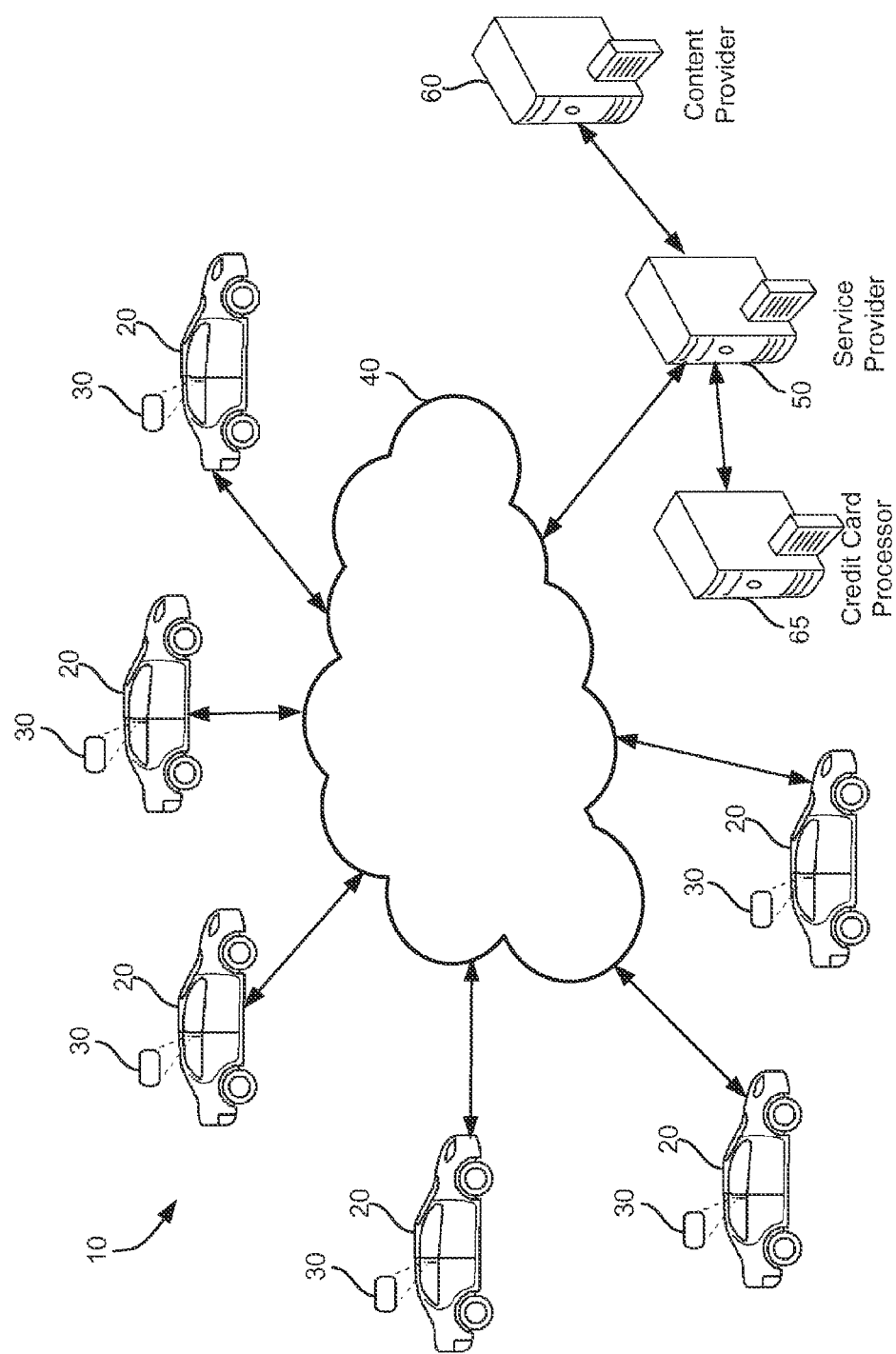
FIG. 1 is an exemplary environment for a vehicle for hire.

FIG. 1 is an exemplary environment 10 for the vehicles for hire, e.g., taxicabs 20 that uses PIMs 30, in which the systems, methods and logic may be practiced. A communication network 40 can transmit various types of information to and from the PIM 30, e.g. as initiated by a blind or visually or impaired passenger, in the taxicab 20. The environment 10 may utilize the communication network 40 to connect a service provider 50, e.g., Creative Mobile Technologies, LLC (CMT), to the PIM 30. The service provider 50 can receive and send information from and to the PIM 30. For example, the service provider 50 can provide media content to the PIM 30 and receive, passenger inputs, fare information, location information, etc. from the PIM 30. The service provider 50 can connect to other entities including a content provider 60 and a credit card processor 64. The content provider 60 can provide content and advertising information to the service provider 50 to send to the PIM 30 through the communication network 40, and the credit card processor 64 can authorize credit card transactions received from the taxicab 20.

Figure 2A:
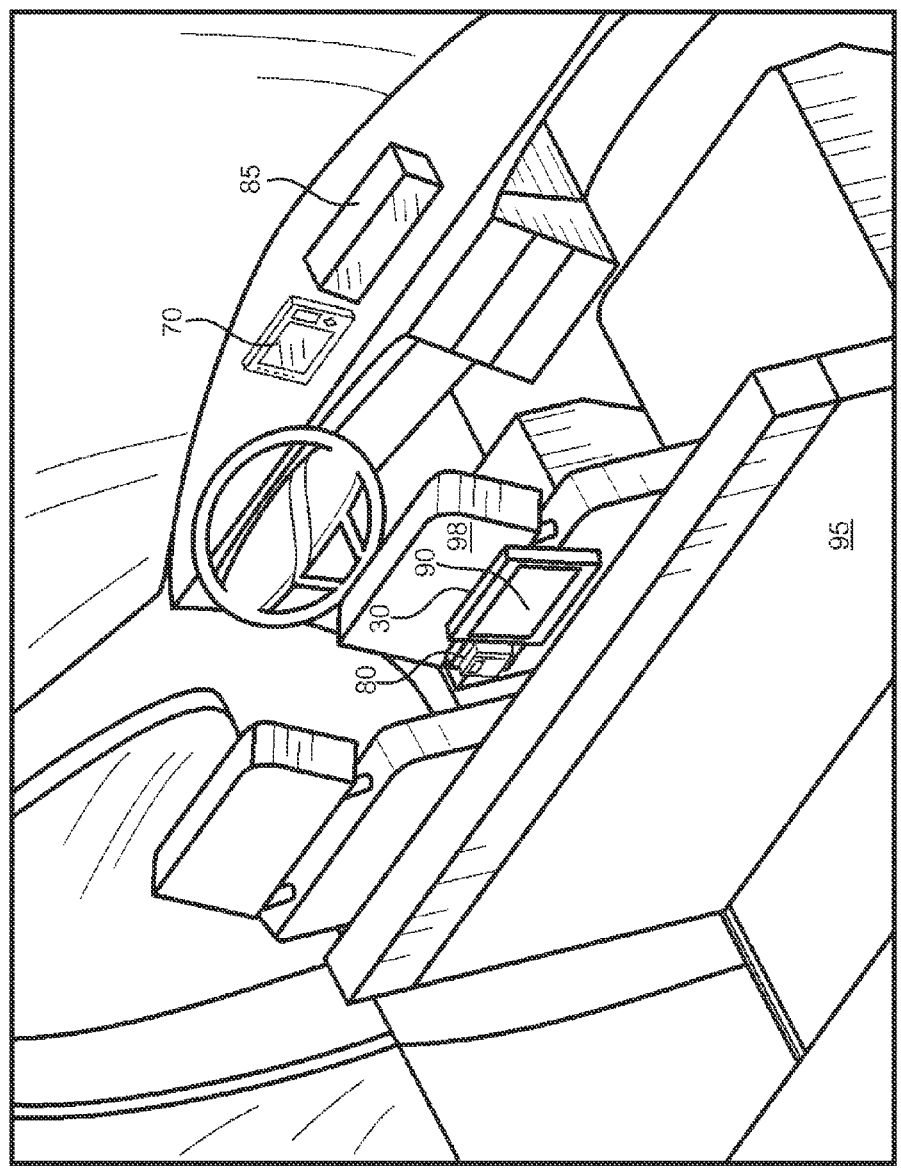
FIGS. 2A and 2B are a perspective view showing an example PIM in a taxicab.
Figure 2B:
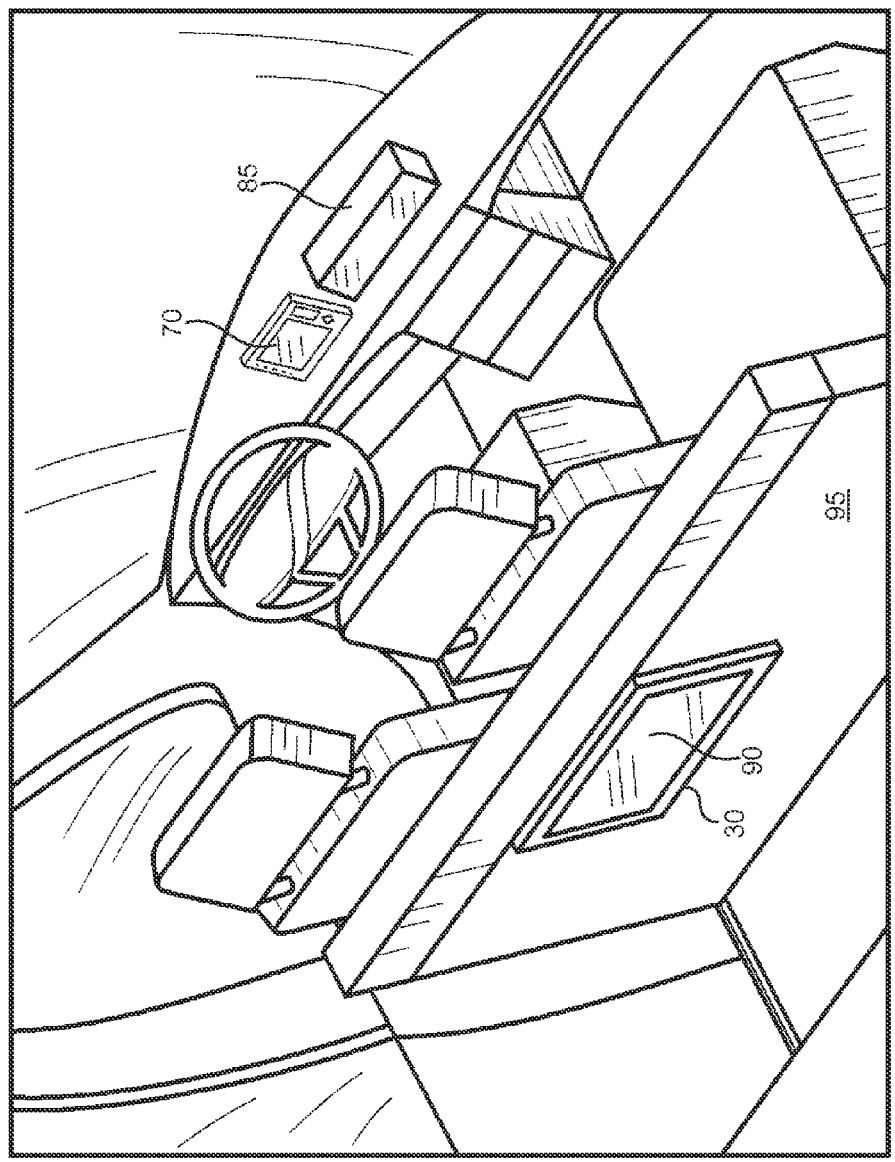

FIGS. 2A and 2B are an exemplary view of the PIM 30 located in the taxicab 20. The taxicab 20, or other transportation vehicle, can also include other devices, e.g., a driver unit 70, wireless communication device, payment device 80, and may include a meter 85. The driver unit 70 can be used to assist with credit card and debit card payments and activating a low vision mode of the PIM 30.

Passengers, including blind and low vision passengers, can interact with the PIM 30 via an interface 90 of the PIM 30, e.g., an integrated touch screen display. To provide access to the interface 90, the PIM 30 can be recessed into the taxicab's cabin partition 95 (e.g., FIG. 2B), recessed into a plexiglass portion of the partition and/or mounted to a back of the front seat headrest 98. Therefore, the PIMs 30 are viewable and accessible by passengers seated in the taxicab 20 (e.g., FIG. 2A). The payment device 80 can be mounted next to the PIM 30 or integrated with the PIM 30. The payment device 80 includes a card reader for receiving information from a credit card or debit card. At the end of the trip, PIM 30 enables the passenger to pay the fare by credit card or debit card, optionally including the easy calculation of tips by interaction with the touch screen display.

Figure 3:
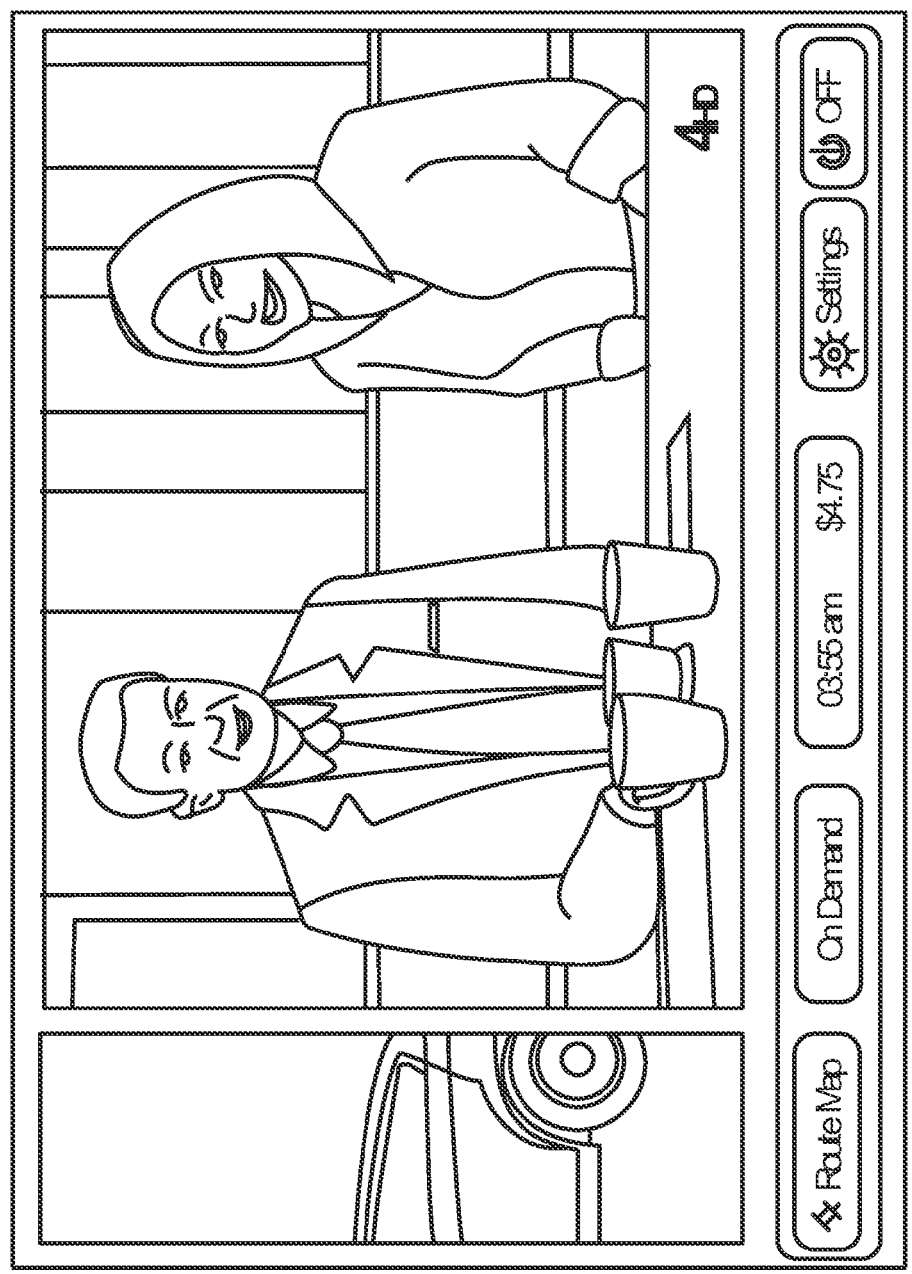
FIGS. 3-5 are an exemplary front view of the interface of the PIM in a first mode.
Figure 4:
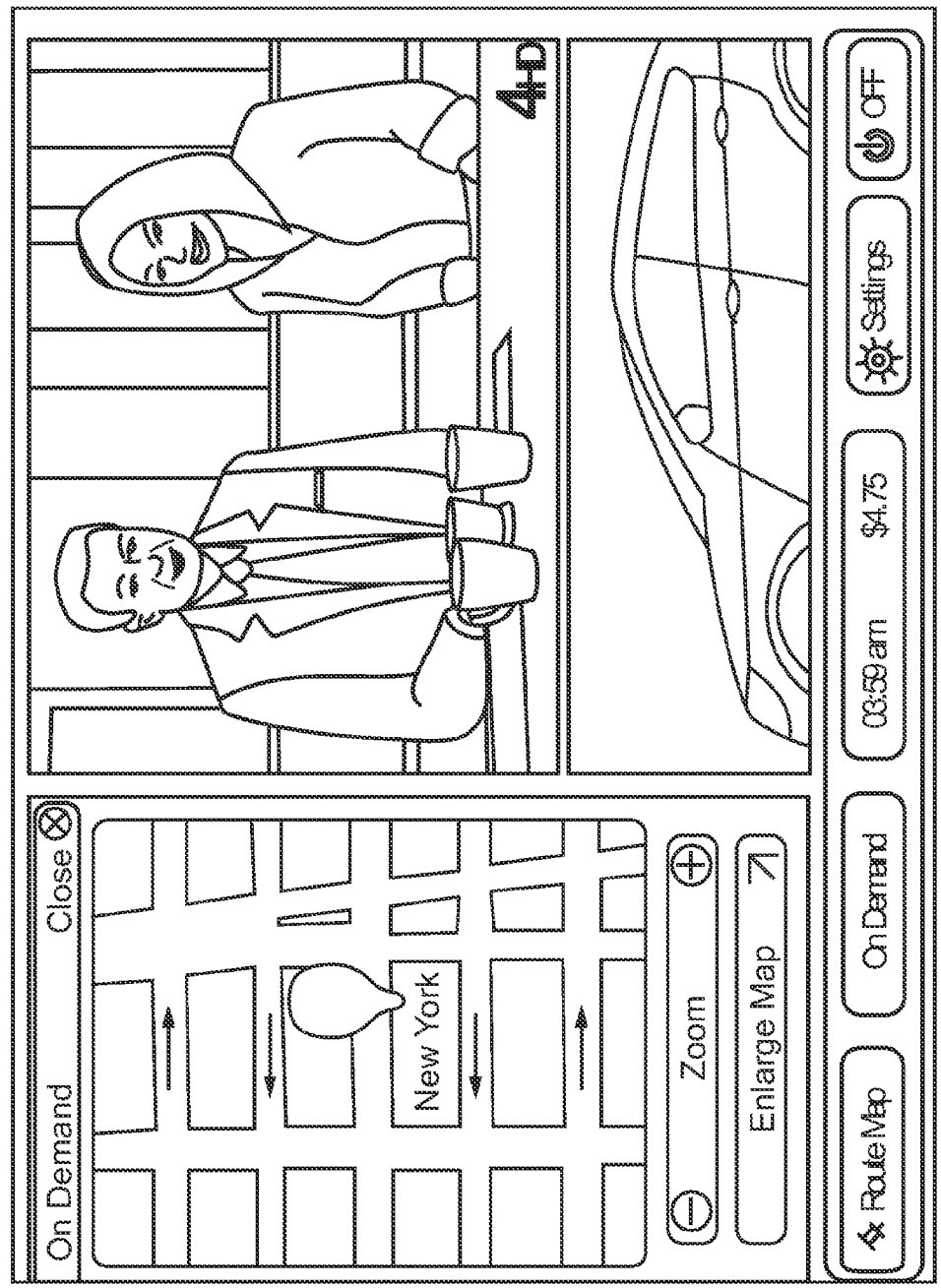
Figure 5:
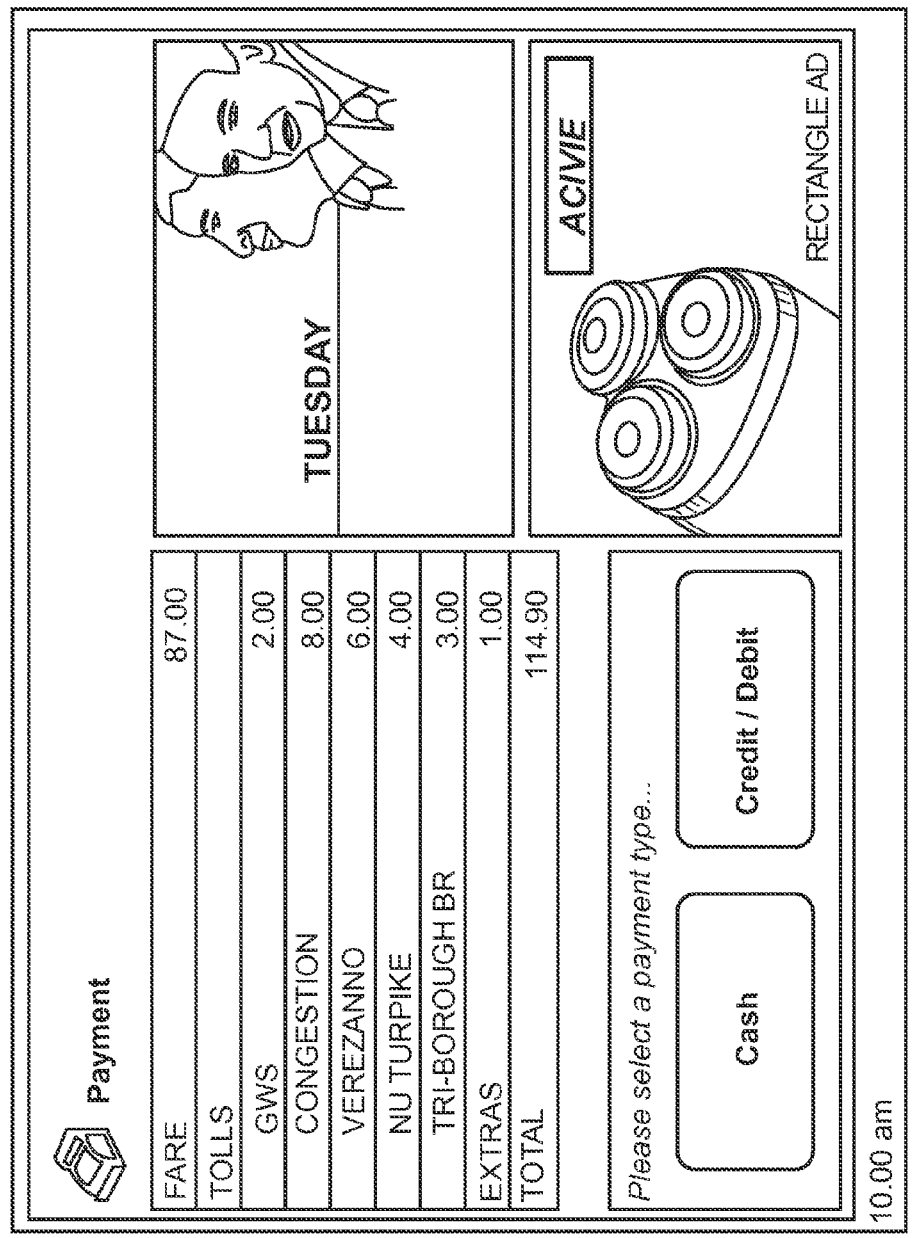

FIGS. 3-5 are an exemplary front view of the interface 90 of the PIM in a first mode. The interface 90 incorporates display areas (sometimes referred to as "buttons") which, when touched by the passenger, navigates the interface 90 to a different menu or screen. For example, in FIG. 3 a main menu includes buttons for the route map, on demand content, settings, and for turning the screen on/off. Many other menus and screens also use buttons, and display the current fare as it increases. In many cities, the fare is variable depending on the distance driven and other factors. In FIG. 4, the display area may also show a map on a portion of the screen. The screen in FIG. 5 has buttons for the selection of payment type, e.g., cash or credit/debit. The size of the buttons and maps may be difficult for a low vision person to see, however, and there are no audio prompts to aid a low vision or blind person.

Therefore, there are situations in which the interface 90 of a PIM 30 of FIGS. 3-5 cannot be effectively used by a person who is blind or has low vision. Other concerns of people who are blind or have low vision include that, because they cannot read the fare information on the interface 90, they are concerned that the driver might try to charge them the wrong fare. Also, because they cannot see the map on the interface 90, or their surroundings, e.g., by looking out the window, they are concerned the driver may be dropping them in the wrong location or have taken an unnecessarily long route. Some adaptations for the visually impaired, such as Braille-encoded keys, may not work as well as the PIM 30 with its interface 90 and may cost more than a touch screen centric PIM 30.

Figure 6:
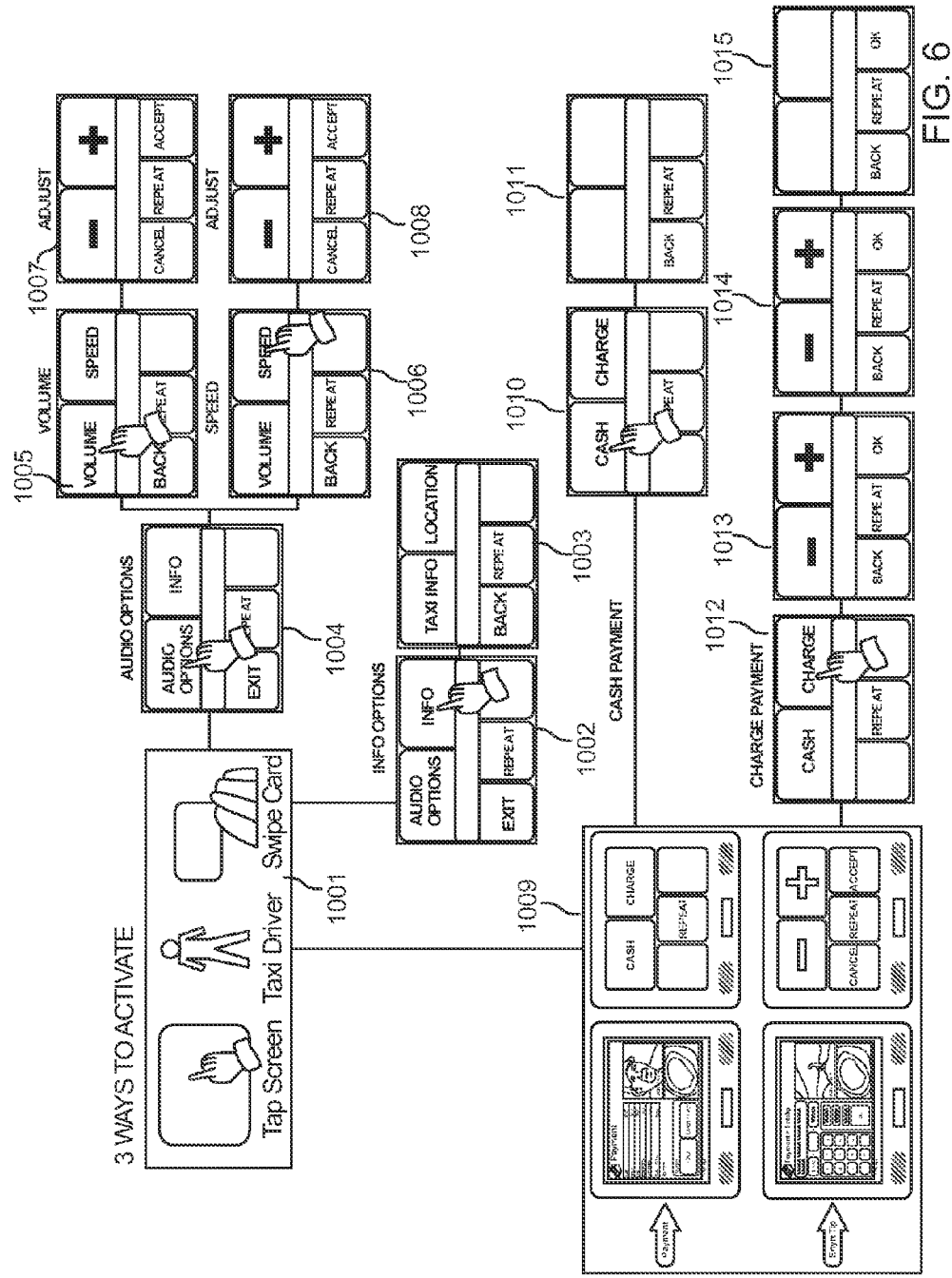
FIG. 6 illustrates an exemplary basic structure and navigation of a low vision mode of the PIM.

FIG. 6 illustrates an exemplary basic structure and navigation of a second mode different than the first mode, e.g., the low vision mode. The interface 90 of a PIM 30 may be adapted to include a second mode, e.g., low vision mode, as described herein so that it can used by blind and low vision passengers. In the low vision mode, the interface 90 of the PIM 30 can allow the low vision passenger to touch the screen at any point of the ride to adjust the voice volume and tempo, hear a Passenger Bill of Rights, and hear the current location and fare. It can also allow the low vision passenger to touch the screen at any point of the ride to hear the vehicle's medallion number and hear the driver's ID. The touch screen interface 90 allows the low vision passengers to interact with the PIM 30. Interface 90, and audio prompts and cues can provide a secure manner for a low vision person to confidently make a credit card payment knowing that they have paid the proper fare. For example, the audio prompts may guide the passenger on a proper orientation of the credit card when interacting with the payment device 80, e.g., by instructing the passenger to hold the credit card vertically with the embossed lettering on the right. In another aspect, the interface 90 of the PIM includes an audible elements announcing the amount of fare at regular periods.

There can be various ways to activate the low vision mode as illustrated in starting block 1001. The blind or low vision passenger can multi-tap anywhere on the interface 90 during the trip to activate the mode. The driver of the taxi 20 can activate the low vision mode on behalf of the passenger. The driver unit 70 allows the driver to interact with PIM 30 for assisting passengers with activating the low vision mode. Additionally or alternatively, a swipe card can be made available that will allow the low vision passenger to activate the low vision mode by swiping the card on the PIM from the back seat of the taxi. The swipe card can be of the same form factor as a conventional credit card with a magnetic stripe, or it can be of a different form factor. Other ways of activating the low vision more are possible, e.g., voice activation, etc.

Figure 7:
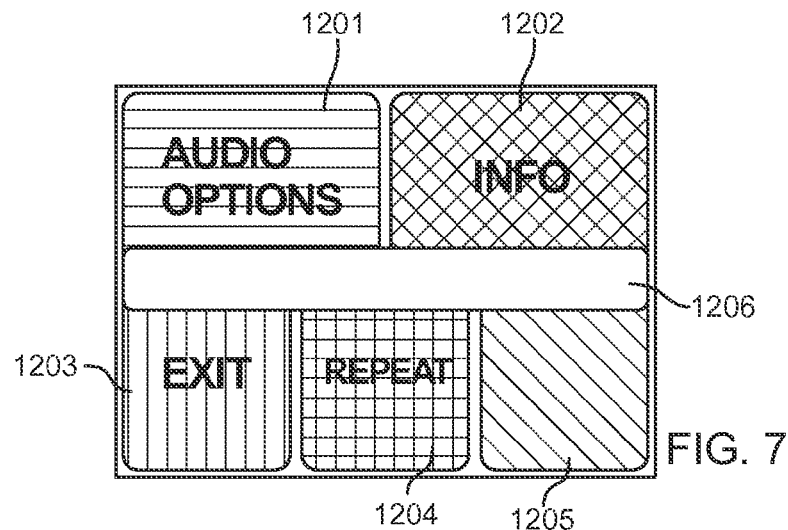
FIG. 7 shows a base screen of a low vision mode.

When the low vision mode is activated, it brings up the exemplary main screen shown in FIG. 7. The screen can include five main portions, 1201, 1202, 1203, 1204 and 1205. Portions 1201 and 1202 can equally divide a top half of the screen and portions 1203, 1204 and 1205 can equally divide a bottom half of the screen. Other numbers of portions and divisions can be used. The portions 1201, 1202, 1203, 1204 and 1205 can also include colors, fonts and contrasts to help maximize visibility to low vision passengers. For example, portion 1201 can be colored blue, portion 1202 orange, portion 1203 red, portion 1204 yellow and portion 1205 green. Other colors can be used. The font color can be white. A center portion 1206 of the screen can be displayed as a horizontal bar across the screen, e.g., to show fare information. The portions 1201, 1202, 1203, 1204 and 1205 of the screen can include textual information to provide prompts to the passenger, or one or more portions 1201, 1202, 1203, 1204 and 1205 may remain blank.

The main screen of the interface 90 can show only an "Audio Options" selection 1201 in the upper left hand portion of the screen, an "Info" selection 1202 in the upper right hand portion of the screen, an "exit" selection 1203 in the lower left portion, a "repeat" selection 1204 in the lower middle section, and a blank lower right portion 1205. There is also a white portion 1206 in the center of the screen. The passenger is able to touch the "repeat" selection 1204 (and any subsequent figures) at any point during the ride (see 1002 in FIG. 6) to get a real-time fare reading as displayed in the white portion 1206. The white portion 1206 can disappear after a determined amount of time that the fare is displayed. Alternatively or additionally, the fare can be displayed with an audio message when the repeat" button is selected. The driver identification (ID) information can also be announced when the "repeat" selection is touched.

Figure 8:
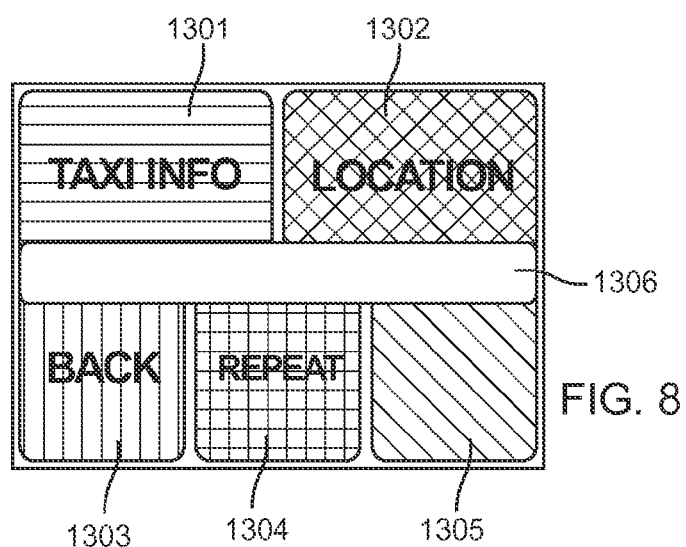
FIG. 8 shows an information options screen of the low vision mode.
Figure 9:
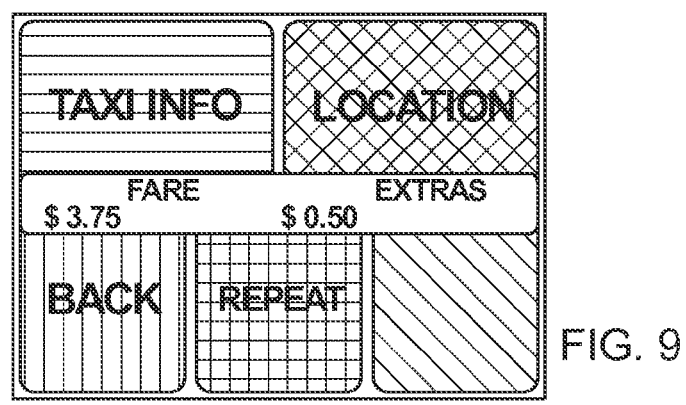
FIG. 9 shows an information options screen of a low vision mode with a fare reading.

During the trip, PIM 30 allows passengers to track their journey on one of several maps with different views and to monitor tolls and surcharges. The passengers may also watch media on the touch screen display, and in some embodiments. Optionally the passengers can use the PIM 30 to access the Internet via the wireless communication device and the wireless network. When the info selection 1202 is touched at any point as shown at 1002 in FIG. 6, an information options screen comes up as shown at 1003 in FIG. 6 and in FIG. 8. The information options screen has a "Taxi Info" selection 1301 in the upper left hand portion of the screen, a "Location" selection 1302 in the upper right hand portion of the screen, a "back" selection 1303 in the lower left portion, a "repeat" selection 1304 in the lower middle section, and a blank lower right portion 1305. There can also be a white portion 1306 in the center of the screen. When "Taxi Info" selection 1301 is touched, a real-time fare reading may appear in white portion 1306 as shown in FIG. 9.

When the "info" button is selected, the PIM 30 can provide information to the passenger such as for example fleet logos, driver identification, and map information. The PIM 30 can also display fare and toll information. Further, the PIM 30 may display media content, such as advertising, to the passenger. The media content may be downloaded through the wireless communication device and stored for display to the passengers via the PIM 30. The content provider 60 such as an advertiser or media distributor, may provide content to the service provider 50 to be made available for display on PIM 30. The media content can include advertisement images and/or text such as news, as well as instructions for distribution of the content. The PIM 30 and the user interaction with the PIM can determine the playback or other aspects associated with the content. For example, the multimedia content can be sent out with activation criteria, such as time or geographic data, so that when the taxicab 20 and the PIM 30 satisfy the activation criteria, the content is activated. The passenger may have the ability to override the display of the multimedia content, and instead provide audio only content.

Figure 10A:
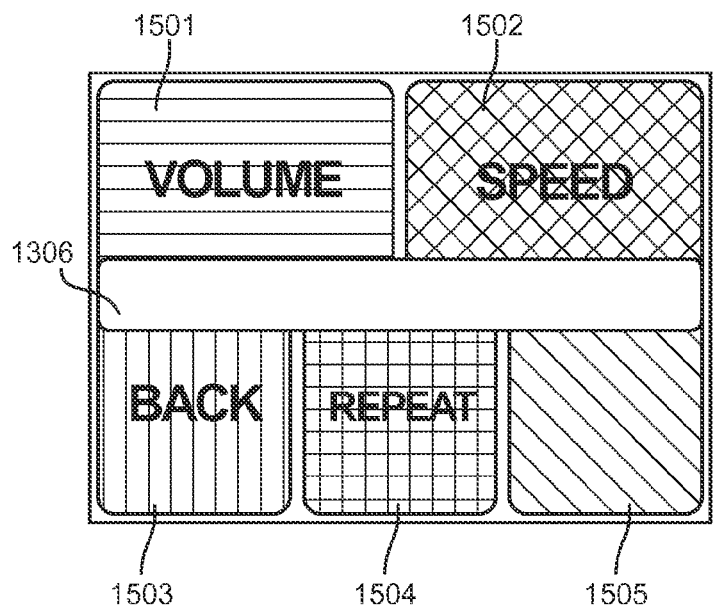
FIG. 10A shows an audio settings screen of the low vision mode.

When "Audio Options" selection 1201 is touched at any point as shown at 1004 in FIG. 6, an audio settings screen comes up as shown in FIG. 10A. The audio settings screen has a "Volume" selection 1501 in the upper left hand portion of the screen, a "Speed" selection 1502 in the upper right hand portion of the screen, a "back" selection 1503 in the lower left portion, a "repeat" selection 1504 in the lower middle section, and a blank lower right portion 1505. There is also the white portion 1306 in the center of the screen.

Figure 10B:
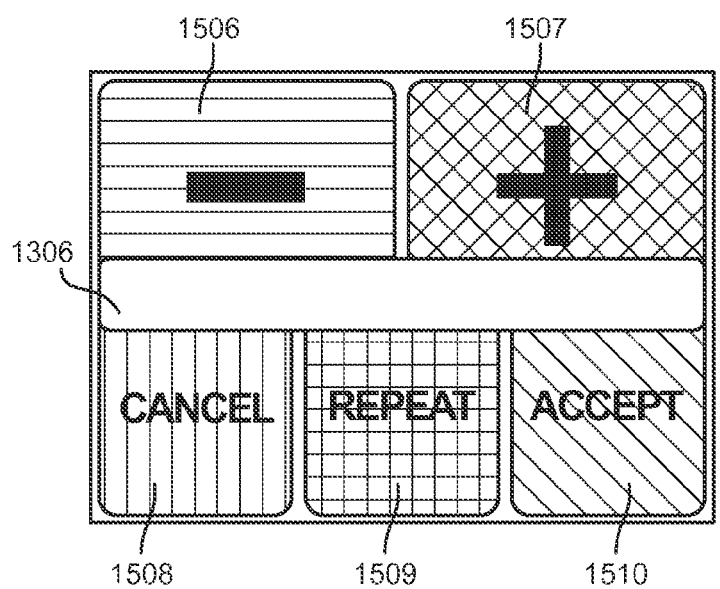
FIG. 10B shows an audio adjustment screen of the low vision mode.

When either "Volume" selection 1501 is touched as shown at 1005 of FIG. 6, or "Speed" selection 1502 is touched as shown at 1006 of FIG. 6, the next screen is the adjustment screen shown in FIG. 10B. The adjustment screen has a "−" symbol 1506 in the upper left hand portion of the screen, a "+" symbol 1507 in the upper right hand portion of the screen, a "cancel" selection 1508 in the lower left portion, a "repeat" selection 1508 in the lower middle section, and a blank lower right portion 1510. There is also the white portion 1306 in the center of the screen. Real-time fare reading may appear in white portion 1306 as shown in FIG. 9.

Figure 11A:
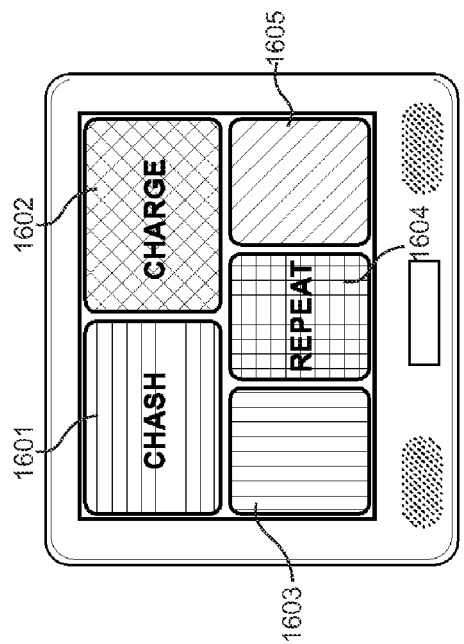
FIG. 11A shows a payment screen for the first mode.
Figure 11B:
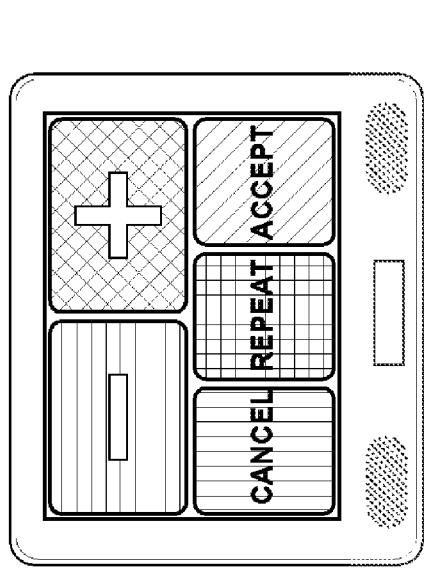
FIG. 11B shows a payment screen of the low vision mode.

When the fare ends, the payment screen for the low vision mode automatically appears as shown at 1009 in FIG. 6 and in FIG. 11B. The payment screen contrasts with the payment screen of the other PIM mode as shown in FIG. 11A. The payment screen in FIG. 11B has a "cash" selection 1601 in the upper left hand portion of the screen, a "charge" selection 1602 in the upper right hand portion of the screen, a blank lower left portion 1603, a "repeat" selection 1604 in the lower middle section, and a blank lower right portion 1605. There may also be an audio announcement when the payment screen appears.

When "cash" selection 1601 is touched as shown at 1010 in FIG. 6, then the simple screen shown at 1011 in FIG. 6 appears: There are no selections in the upper portions because, for a cash payment to be made, no further interaction is necessary.

Figure 12A:
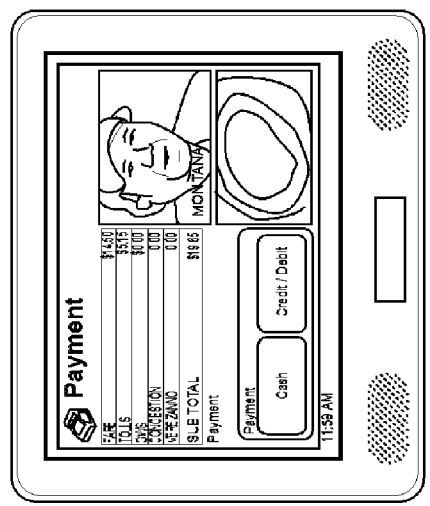
FIG. 12A shows a tip entry screen for the first mode.
Figure 12B:
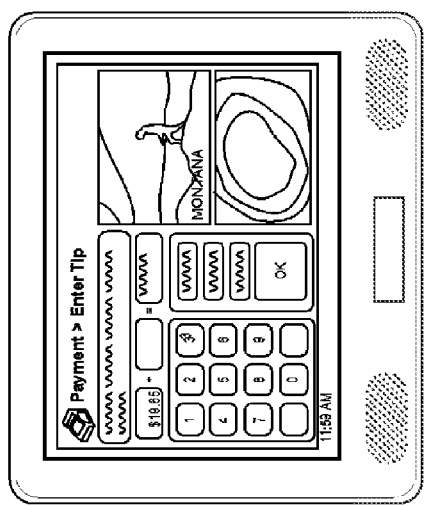
FIG. 12B shows a tip entry screen of the low vision mode.
Figure 13A:
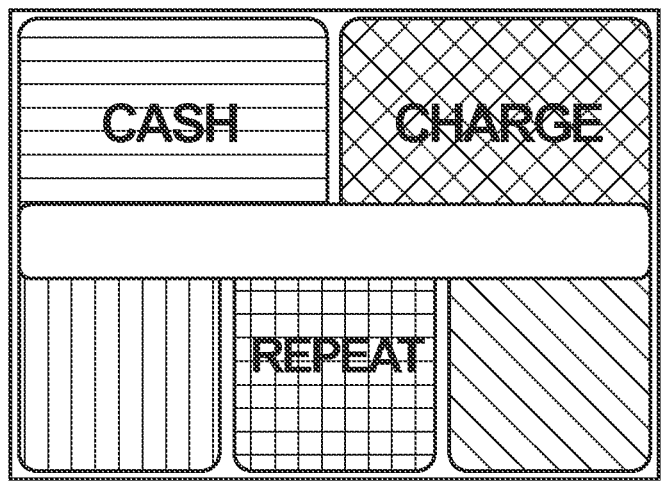
FIG. 13A shows a payment screen of a low vision mode.
Figure 13B:
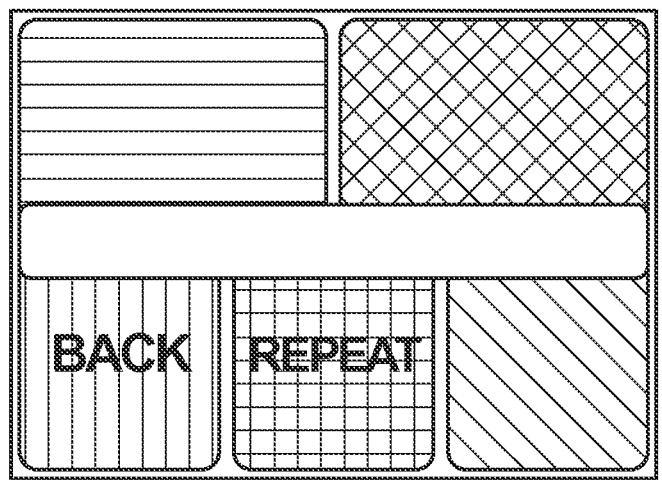
FIG. 13B shows a screen that is displayed when cash payment is selected in FIG. 13A.

FIG. 12A shows a tip entry screen in a first mode, and FIG. 12B shows a tip entry screen of the low vision mode. The low vision mode makes it easier for a low vision passenger to enter a tip since the fonts are bigger and the screen is divided into no more than five portions. FIG. 13A shows a payment screen of a low vision mode and FIG. 13B shows a screen that is displayed when cash payment is selected in FIG. 13A.

Figure 14A:
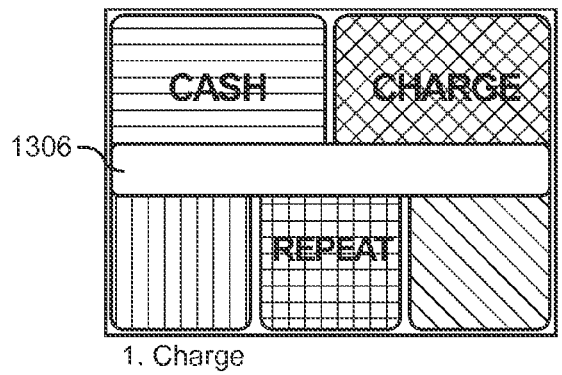
FIG. 14A shows a payment screen of the low vision mode.
Figure 14B:
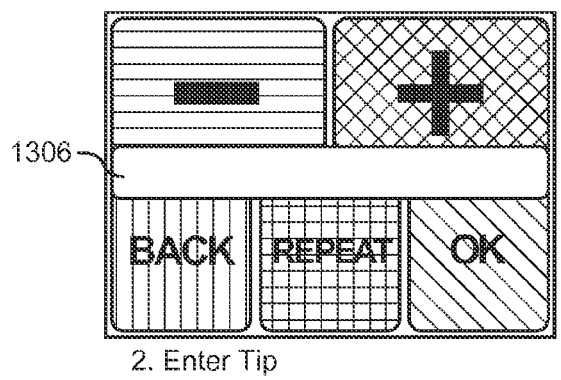
FIG. 14B shows a tip entry screen when charge payment is selected in FIG. 14A.

When "charge" selection 1602 is touched as shown at 1012 in FIG. 6 or FIG. 14A, then the screen shown at 1013 in FIG. 6 and in FIG. 14B is displayed and allows the entry of a tip. The tip entry screen of FIG. 19B has a "−" symbol 1901 in the upper left hand portion of the screen, a "+" symbol 1902 in the upper right hand portion of the screen, a "back" selection 1903 in the lower left portion, a "repeat" selection 1904 in the lower middle section, and an "OK" selection 1905 in the lower right portion. The tip can start at a determined amount and the plus and minus signs can be used to adjust the tip amount. For example, the tip amount can start at zero to make for a positive passenger/driver interaction. The driver hears the tip amount being increased, rather than placing the passenger in a position where they may want to decrease from a defaulted amount. The repeat button can be used to repeat the audio clues to the passenger, and the passenger can accept or cancel the tip with the "OK" and "back" buttons. Additionally or alternatively, the driver may facilitate payment transactions by selecting the buttons on the driver unit 70 that correspond to simple response like "yes" and "no" in response to questions like "are all amounts entered correct?"

Figure 14C:
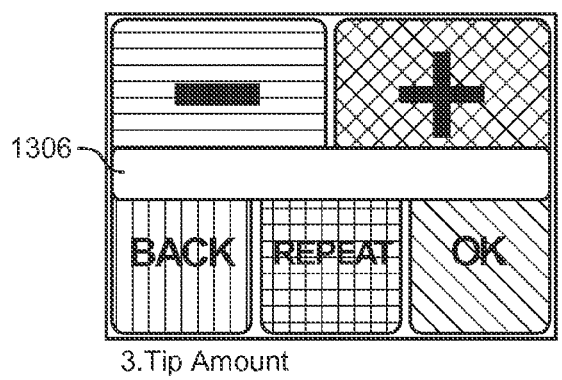
FIG. 14C shows a screen displayed to adjust the tip amount of FIG. 14B
Figure 14D:
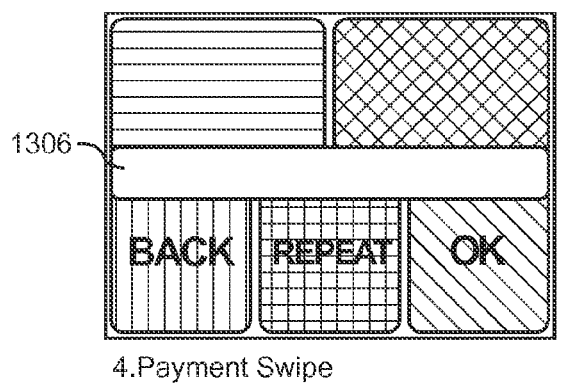
FIG. 14D shows a screen displayed for swiping the charge card for payment.

The same screen as FIG. 14B also allows the amount of the tip to be adjusted as shown at 1014 in FIG. 6 and FIG. 14C. The screen shown at 1015 in FIG. 6 and FIG. 14D is displayed when the charge payment card is swiped.

The white portion 1306 in the center of the screen can be a constant presence throughout the low vision mode. Real-time fare reading may appear in white portion 1306 as shown in FIG. 9 by way of example, but can also appear at other times and on other screens.

Figure 15:
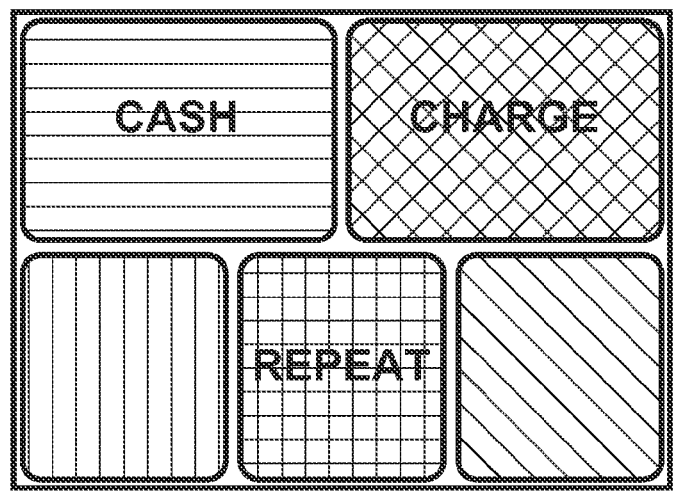
FIG. 15 is another exemplary main payment screen of the PIM.
Figure 16:
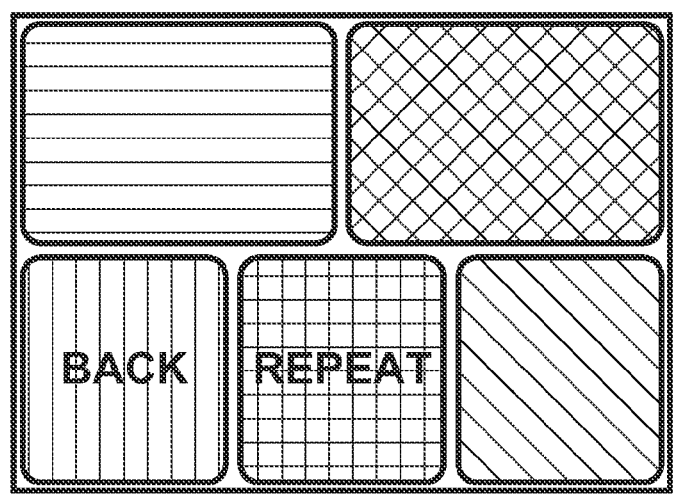
FIG. 16 is another exemplary cash payment screen of the PIM.
Figure 17:
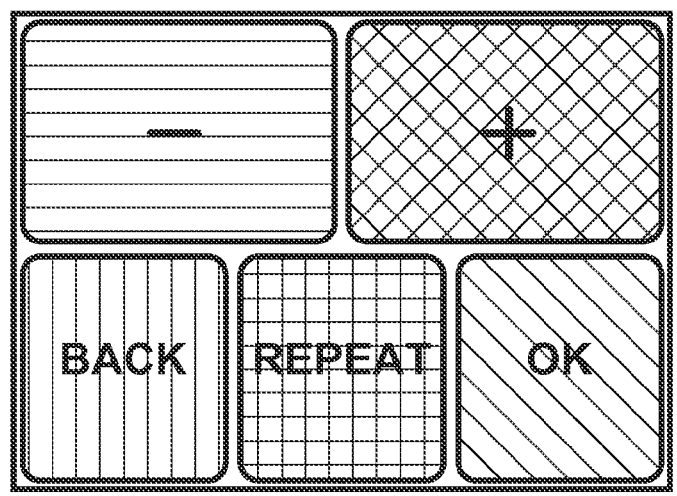
FIG. 17 is another exemplary screen for soliciting a tip of the PIM.
Figure 18:
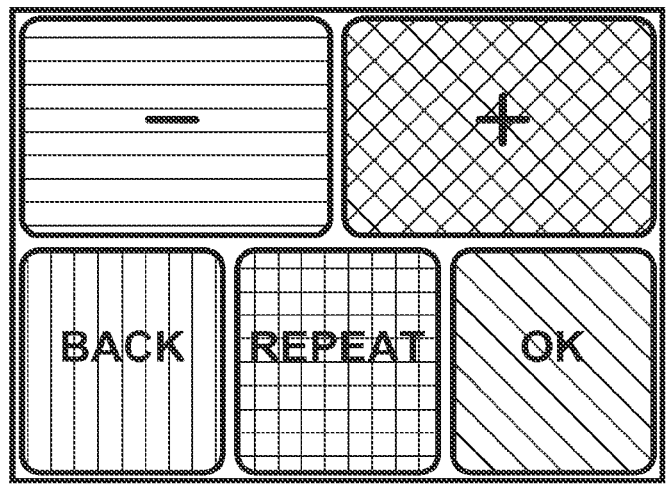
FIG. 18 is another exemplary tip amount screen of the PIM.
Figure 19:
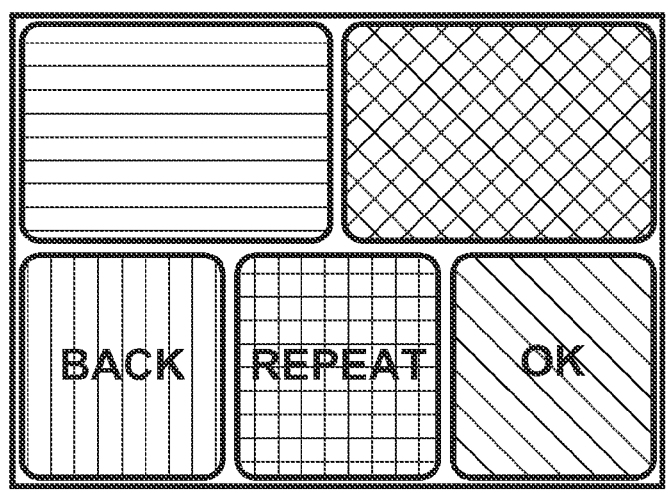
FIG. 19 is another exemplary tip entered screen of the PIM.
Figure 20:
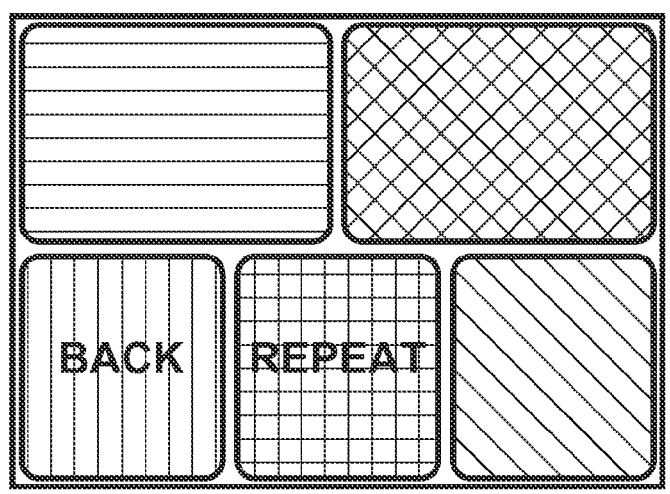
FIG. 20 is another exemplary payment swipe screen of the PIM.
Figure 21:
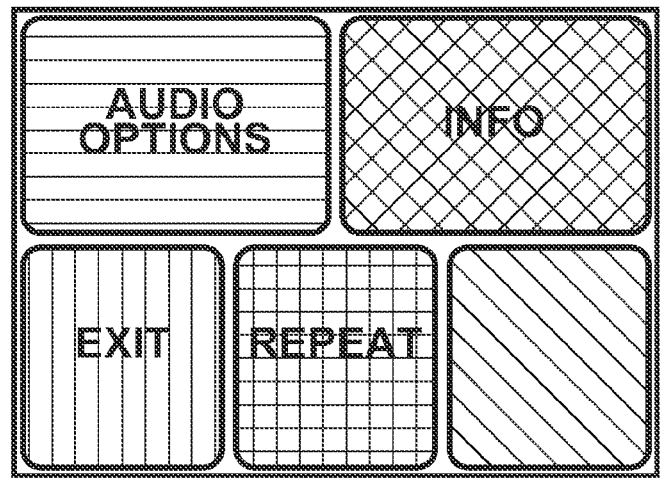
FIG. 21 is another exemplary audio options screen of the PIM.
Figure 22:
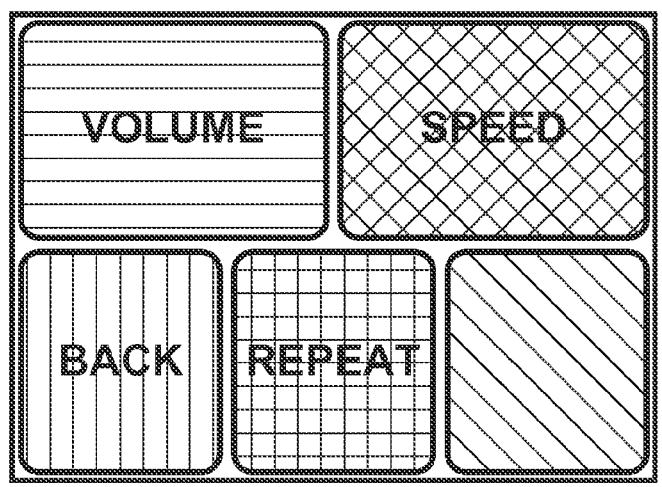
FIG. 22 is another exemplary volume adjust settings screen of the PIM.
Figure 23:
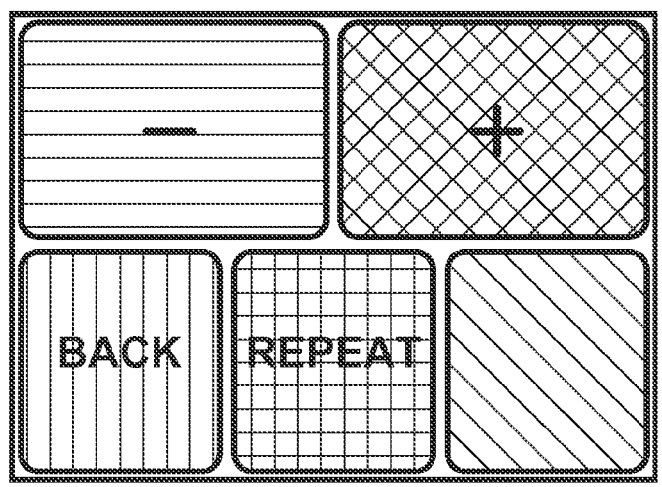
FIG. 23 is another exemplary screen for adjusting the audio volume or speed of the PIM.
Figure 24:
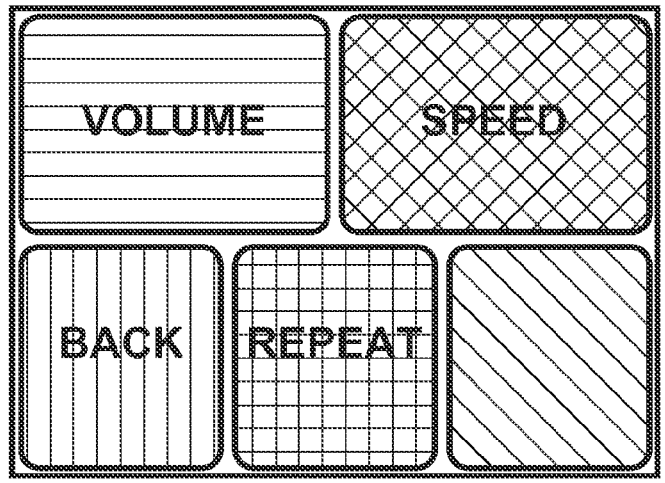
FIG. 24 is another exemplary speed adjust settings screen of the PIM.
Figure 25:
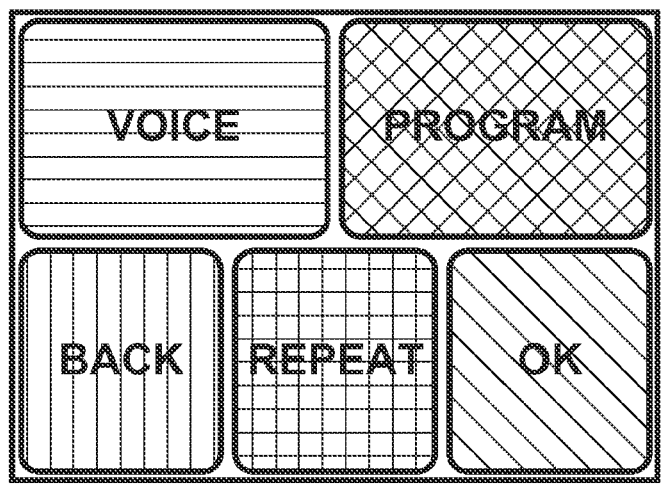
FIG. 25 is another exemplary speed adjust settings screen of the PIM.
Figure 26:
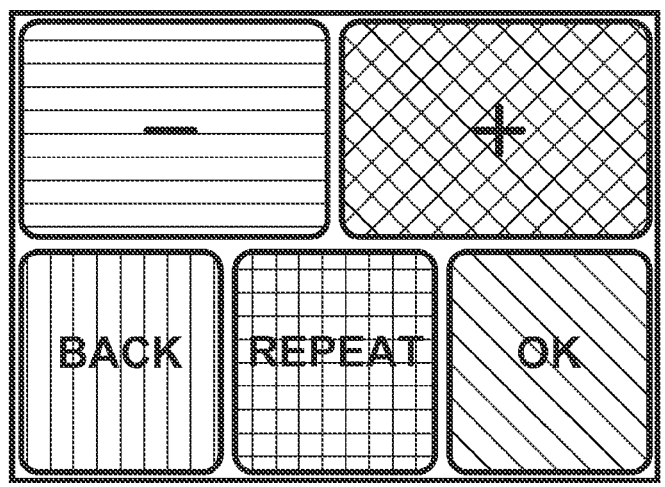
FIG. 26 is another exemplary speed adjust settings screen of the PIM.

In another embodiment shown in FIGS. 15-26, there is no white portion 1306 in the display screens. FIG. 15 is an exemplary main payment screen of the PIM according to another embodiment. FIG. 16 is an exemplary cash payment screen of the PIM according to another embodiment. FIG. 17 is an exemplary screen for soliciting a tip of the PIM according to another embodiment. FIG. 18 is an exemplary tip amount screen of the PIM according to another embodiment. FIG. 19 is an exemplary tip entered screen of the PIM according to another embodiment. FIG. 20 is an exemplary payment swipe screen of the PIM according to another embodiment. FIG. 21 is an exemplary audio options screen of the PIM according to another embodiment. FIG. 22 is an exemplary volume adjust settings screen of the PIM according to another embodiment. FIG. 23 is an exemplary screen for adjusting the audio volume or speed of the PIM according to another embodiment. FIG. 24 is an exemplary speed adjust settings screen of the PIM according to another embodiment. FIG. 25 is another exemplary speed adjust settings screen of the PIM according to another embodiment. FIG. 26 is another exemplary speed adjust settings screen of the PIM according to another embodiment.

Another embodiment may state the taxi fare through audio only, either when prompted or at periodic intervals. The PIM 30 may offer options to the passenger to enable/disable the audio announcements of the fare. At the end of a trip, the passenger can pay for their ride using credit or debit, etc. The service provider 50 may receive the payment information from the passengers via the communication network 40, forward the payment information to the credit card processor 65, and selectively return a verification to the passengers as displayed by the PIM 30 that the payment was successfully made.

The systems, methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Many modifications and other embodiments set forth herein will come to mind to one skilled in the art having the benefit of the teachings presented in the foregoing descriptions and the associated drawings. Although specific terms are employed herein, they are used in a generic and descriptive sense only and not for purposes of limitation.

The invention claimed is:

1. A passenger information module for a vehicle for hire, comprising:
   an integrated touch screen display mounted to or recessed into a structure of the vehicle for hire, the touch screen display facing a passenger in the vehicle for hire so as to be accessible to the passenger;
   a payment meter disposed in the vehicle for hire configured to provide an indication of payment due from the passenger, and operatively coupled to the touch screen display;
   a payment card reader disposed in the vehicle for hire to receive payment from the passenger;
   an interface controlled by a processor and configured provide an audio output and configured to output textual and graphical information to the touch screen display, the interface responsive to input provided by the passenger;
   the interface automatically activating, by the processor, a standard display mode or a visually impaired display mode on the touch screen display based on the input provided by the passenger;
   wherein the visually impaired display mode provides an input framework for visually impaired passengers and provides content on the touch screen display in an enlarged format relative to the standard display mode; and
   wherein the visually impaired display mode provides less content in an uncluttered format on selected screens of the touch screen display relative to the standard display mode, and further provides audio prompting that periodically announces vehicle location and driver identification to the visually impaired passenger.

2. The passenger information module of claim 1, where the visually impaired display mode is further configured to provide audio prompting to the visually impaired passengers.

3. The passenger information module of claim 2, where the audio prompting comprises periodically announcing fare information.

4. The passenger information module of claim 1, where the audio prompting comprises instruction for proper orientation of the credit card for payment.

5. The passenger information module of claim 1, where the input framework comprises five sections.

6. The passenger information module of claim 5, where the five sections comprise two section locate on a top portion and two section located on a bottom portion.

7. The passenger information module of claim 5, where the five portions include the colors blue, orange, red, yellow and green.

8. The passenger information module of claim 5, where the five portions include only an audio options button, an information button, an exit button and a repeat button.

9. The passenger information module of claim 1, wherein the visually impaired display mode is initiated with a double tap on the interface.

10. The passenger information module of claim 1, where the interface is configured to adjust a voice volume and a tempo of audio prompts.

11. The passenger information module of claim 1, where the interface module is configured to audibly provide a Passenger Bill of Rights, a current location and a fare when prompted.

12. The passenger information module of claim 1, where the interface module is configured to audibly provide a vehicle medallion number and an identification of a driver.

13. A passenger information module for a vehicle for hire, comprising:
   an interface controlled by the passenger information module, the interface having a touch screen display and an audio output device, the touch screen display accessible to a passenger in the vehicle for hire;
   the interface providing a standard mode and a visually impaired mode on the touch screen display, wherein the visually impaired mode is selected by the passenger or an operator of the vehicle for hire; and
   the visually impaired mode different than the standard mode, where the visually impaired mode is selected by the passenger for hire or an operator of the vehicle for hire, and is configured to provide audio prompting on the audio output device for visually impaired passengers of the vehicle for hire, wherein the audio prompting announces vehicle location and driver identification to the visually impaired passengers.

14. The passenger information module of claim 13, where the audio prompting comprises periodically announcing fare and location information.

15. The passenger information module of claim 13, where the audio prompting comprises instruction for paying a tip and proper orientation of the credit card for payment.

16. The passenger information module of claim 13, wherein the visually impaired mode is initiated with a double tap on the interface.

17. The passenger information module of claim 13, where the interface is configured to adjust a voice volume and a tempo of audio prompts.

18. A method of communicating instructions to a visually impaired passenger in a vehicle for hire, comprising:
- providing an interface, the interface including a touch screen display and an audio output device, wherein the touch screen displays operates in a standard mode and a visually impaired mode; receiving a input by the passenger or an operator of the vehicle for hire, to change the interface from the standard mode to the visually impaired mode, the visually impaired mode being different from the standard mode;
- providing by the visually impaired mode, a visual input framework and audio prompts for the visually impaired passengers;
- wherein the visually impaired mode provides content on the touch screen display in an enlarged format relative to the standard mode;
- wherein the visually impaired mode provides less content in an uncluttered format on selected screens of the touch screen display relative to the standard mode; and
- wherein the visually impaired mode provides audio prompting that announces vehicle location and driver identification to the visually impaired passengers.

19. The method of claim 18, where the audio prompts comprise instructions for paying a fare of the vehicle for hire by credit card including a fare amount, a tip amount and an orientation of the credit card.

* * * * *